(12) United States Patent
Roberts

(10) Patent No.: US 11,913,682 B2
(45) Date of Patent: Feb. 27, 2024

(54) APPARATUS FOR SELECTIVELY HEATING OR COOLING A FOOD PRODUCT AND METHODS OF ASSEMBLING AND USING SAME

(71) Applicant: Chillware, LLC, DeSoto, IL (US)

(72) Inventor: Brian Roberts, DeSoto, IL (US)

(73) Assignee: Chillware, LLC, Desoto (IL)

( * ) Notice: Subject to any disclaimer, the term of this patent is extended or adjusted under 35 U.S.C. 154(b) by 31 days.

(21) Appl. No.: 17/559,309

(22) Filed: Dec. 22, 2021

(65) Prior Publication Data

US 2022/0196297 A1    Jun. 23, 2022

Related U.S. Application Data

(60) Provisional application No. 63/199,411, filed on Dec. 23, 2020.

(51) Int. Cl.
| | |
|---|---|
| *F25B 21/04* | (2006.01) |
| *A47J 27/00* | (2006.01) |
| *A47J 41/00* | (2006.01) |

(52) U.S. Cl.
CPC ............ *F25B 21/04* (2013.01); *A47J 27/004* (2013.01); *A47J 41/005* (2013.01); *F25B 2321/0212* (2013.01); *F25B 2321/0251* (2013.01)

(58) Field of Classification Search
CPC .............. F25B 21/04; F25B 2321/0212; F25B 2321/025; A47J 27/004; A47J 41/005; F25D 2331/812; F24F 1/42
See application file for complete search history.

(56) References Cited

U.S. PATENT DOCUMENTS

| | | | | |
|---|---|---|---|---|
| 4,759,190 A | * | 7/1988 | Trachtenberg | ......... H10N 10/00 62/3.62 |
| 5,060,479 A | | 10/1991 | Carmi et al. | |

(Continued)

FOREIGN PATENT DOCUMENTS

| | | |
|---|---|---|
| CA | 1306511 C | 8/1992 |
| CN | 201798586 U | 4/2011 |

(Continued)

OTHER PUBLICATIONS

"Cooled Buffet Showcase N°1 Varnished Beech Wood," Product web page accessed on Jan. 5, 2022 at URL:https://www.stellinox.com/747-cooled-buffet-showcase-n1-varnished-beech-wood-3118704006055.html.

(Continued)

*Primary Examiner* — David J Teitelbaum
(74) *Attorney, Agent, or Firm* — Armstrong Teasdale LLP

(57) ABSTRACT

An apparatus for selectively heating or cooling a food product includes a housing including a shell and a thermally-conductive liner coupled to the shell. The shell defines a housing cavity, and the thermally-conductive liner defines a receptacle. The apparatus also includes a removable tray and a plurality of thermoelectric heating/cooling devices disposed within the housing cavity. The removable tray is sized and shaped to be received within the receptacle such that the removable tray is coupled in thermal communication with the thermally-conductive liner. Each of the thermoelectric heating/cooling devices is selectively operable in a heating mode and a cooling mode and is coupled in thermal communication with the thermally-conductive liner such that the liner draws heat away from the removable tray when the thermoelectric devices are operated in the cooling mode, and the liner transfers heat to the removable tray when the thermoelectric devices are operated in the heating mode.

20 Claims, 6 Drawing Sheets

(56) References Cited

U.S. PATENT DOCUMENTS

| | | | |
|---|---|---|---|
| 5,718,124 A * | 2/1998 | Senecal | A47F 3/0443 |
| | | | 62/3.6 |
| 5,842,353 A * | 12/1998 | Kuo-Liang | A47G 19/2288 |
| | | | 219/419 |
| 5,860,281 A | 1/1999 | Coffee et al. | |
| 6,279,470 B2 | 8/2001 | Simeray et al. | |
| 6,422,024 B1 * | 7/2002 | Foye | H10N 10/00 |
| | | | 62/3.2 |
| 6,732,533 B1 | 5/2004 | Giles | |
| 9,857,107 B2 | 1/2018 | Inaba et al. | |
| 10,383,476 B2 | 8/2019 | Alexander et al. | |
| 10,670,323 B2 | 6/2020 | Alexander et al. | |
| 10,856,687 B1 | 12/2020 | Sargent | |
| 2005/0005612 A1 * | 1/2005 | Kennedy | A47J 39/00 |
| | | | 62/3.3 |
| 2006/0277924 A1 * | 12/2006 | Platkin | F25B 21/04 |
| | | | 62/3.3 |
| 2007/0119186 A1 | 5/2007 | Kitchens et al. | |
| 2007/0119187 A1 * | 5/2007 | Kitchens | F25D 19/00 |
| | | | 62/298 |
| 2008/0023462 A1 | 1/2008 | Shei et al. | |
| 2011/0011100 A1 | 1/2011 | Sundhar | |
| 2018/0116433 A1 * | 5/2018 | Smaldone | B65D 81/3869 |
| 2019/0223637 A1 | 7/2019 | Holler et al. | |
| 2019/0269272 A1 | 9/2019 | Itzkowitz | |

FOREIGN PATENT DOCUMENTS

| | | |
|---|---|---|
| CN | 210832609 U | 6/2020 |
| DE | 10196995 B4 | 10/2005 |
| ID | 513614 A | 8/2011 |
| IN | 201917014862 A | 7/2019 |
| TW | I350740 B | 10/2011 |
| WO | 2007097578 A1 | 8/2007 |
| WO | 2011068988 A1 | 6/2011 |
| WO | 2011121441 A2 | 10/2011 |

OTHER PUBLICATIONS

"Duke HB4-1H3C 60" Hot/Cold Portable Buffet w/ (1) Hot Well & (3) Cold Sections," Product web page accessed on Jan. 5, 2022 at URL: https://www.katom.com/212-HB41H3C2081.html.

"Chefman Mini Portable Black Personal Fridge Cools or Heats and Provides Compact Storage for Skincare, Snacks, or 6 12oz Cans W/A Lightweight 4-liter Capacity to Take on the Go," Amazon product web page accessed on Jan. 5, 2022 at URL: https://www.amazon.com/Chefman-Portable-Personal-Capacity-Freon-Free/dp/B076X7HF7F?th=1.

"Peltier Plate for Cooling and Heating with Arduino," Product blog post, Published Dec. 15, 2014, accessed on Jan. 5, 2022 at URL: https://tinkererblog.wordpress.com/2014/12/15/peltier-cooling-and-heating-with-arduino/.

"Cold Food Tables" Product page accessed on Jan. 5, 2022 at URL: https://www.webstaurantstore.com/13647/cold-food-tables.html.

International Search Report and Written Opinion for International Application No. PCT/US2021/064827, dated May 26, 2022, 11 pages.

* cited by examiner

APPARATUS FOR SELECTIVELY HEATING OR COOLING A FOOD PRODUCT AND METHODS OF ASSEMBLING AND USING SAME

CROSS-REFERENCE TO RELATED APPLICATIONS

This application claims the benefit of U.S. Provisional Patent Application No. 63/199,411, filed on Dec. 23, 2020, and titled "FOOD SERVING APPARATUS WITH ACTIVE HEATING AND COOLING ELEMENTS," the entire contents and disclosure of which are hereby incorporated by reference in their entirety.

BACKGROUND

This disclosure relates generally to food serving apparatus, and more particularly, to food serving apparatus capable of both heating and cooling food.

At least some known food serving apparatus include frozen freezer packs to cool or maintain food at a temperature below ambient or room temperature. At least some of these apparatus do not maintain uniform temperatures or work well over extended periods of time because the freezer packs melt/thaw. Other apparatus capable of maintaining food products at temperatures below room temperature include active cooling elements (e.g., freezers), but typically are not designed to hold food in a ready-to-serve and unpackaged format. Additionally, at least some known apparatus are capable of heating and/or maintaining food at temperatures above ambient or room temperature (e.g., slow cookers). However, these devices are generally not designed to cool food products or maintain food products at temperatures below ambient or room temperatures.

Additionally, while some devices are capable of selectively cooling and heating a food product, such devices have less than optimal designs to effectively and uniformly heat and/or cool the food product within a food serving tray of the device. Furthermore, at least some known combination heating/cooling devices include food serving trays that cannot be removed from the device.

Accordingly, a need exists for improved portable food serving apparatus capable of selectively heating and cooling a food product.

This section is intended to introduce the reader to various aspects of the art that may be related to various aspects of the disclosure which are described and/or claimed below. This discussion is believed to be helpful in providing the reader with background information to facilitate a better understanding of the various aspects of the present disclosure. Accordingly, it should be understood that these statements are to be read in this light, and not as admission of prior art.

BRIEF DESCRIPTION OF DISCLOSURE

In one aspect, an apparatus for heating or cooling a food product includes a housing including a shell and a thermally-conductive liner coupled to the shell. The shell defines a housing cavity and the thermally-conductive liner defines a receptacle. The apparatus includes a removable tray sized and shaped to be received within the receptacle such that the removable tray is coupled in thermal communication with the thermally-conductive liner. The apparatus further includes a plurality of thermoelectric heating/cooling devices disposed within the housing cavity. Each of the thermoelectric heating/cooling devices is selectively operable in a heating mode and a cooling mode and is coupled in thermal communication with the thermally-conductive liner such that the thermally-conductive liner draws heat away from the removable tray when the thermoelectric heating/cooling devices are operated in the cooling mode, and the thermally-conductive liner transfers heat to the removable tray when the thermoelectric heating/cooling devices are operated in the heating mode.

In another aspect, a method of assembling an apparatus includes positioning a plurality of thermoelectric heating/cooling devices within a housing cavity defined by a shell. Each of the thermoelectric heating/cooling devices is selectively operable in a heating mode and a cooling mode. The method includes coupling the plurality of thermoelectric heating/cooling devices in thermal communication with a thermally-conductive liner coupled to the shell. The thermally-conductive liner defines a receptacle. The method further includes positioning a removable tray within the receptacle such that the removable tray is coupled in thermal communication with the thermally-conductive liner. The thermally-conductive liner draws heat away from the removable tray when the thermoelectric heating/cooling devices are operated in the cooling mode, and the thermally-conductive liner transfers heat to the removable tray when the thermoelectric heating/cooling devices are operated in the heating mode.

In yet another aspect, a method of using a food serving apparatus including a housing including a shell and a thermally-conductive liner coupled to the shell, the thermally-conductive liner defining a receptacle. The method includes providing a removable tray with a food product contained therein and positioning the removable tray within the receptacle such that the removeable tray is thermally coupled to the thermally-conductive liner. The thermally-conductive liner is thermally coupled to a plurality of thermoelectric heating/cooling devices. The method further includes selectively operating the thermoelectric heating/cooling devices in one of a heating mode and a cooling mode to heat or cool the food product.

BRIEF DESCRIPTION OF THE DRAWINGS

Non-limiting and non-exhaustive embodiments are described with reference to the following Figures, wherein like reference numerals refer to like parts throughout the various drawings unless otherwise specified.

DETAILED DESCRIPTION

Figure 1:
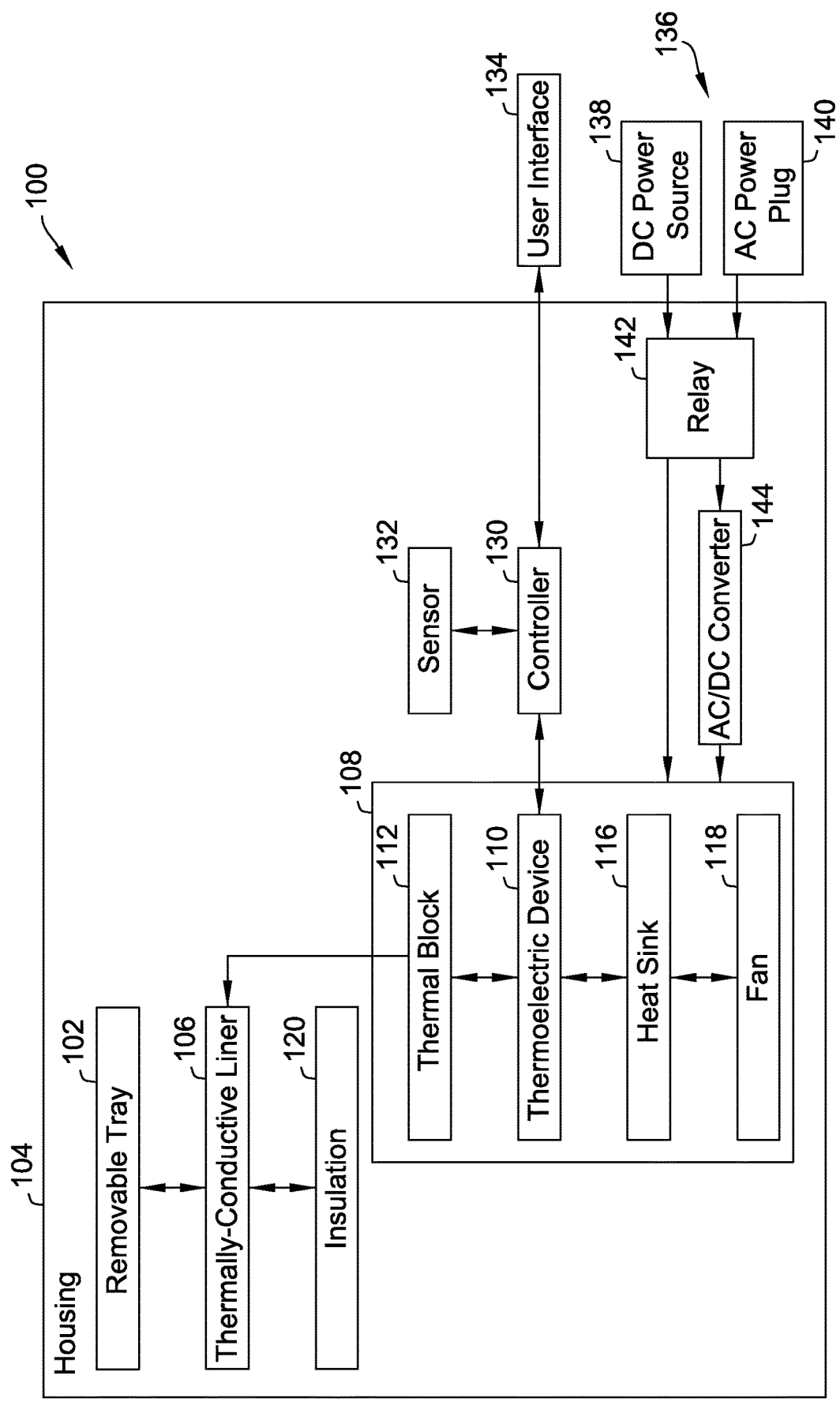
FIG. 1 is a schematic diagram of an apparatus for selectively heating or cooling a food product.

FIG. 1 is a schematic diagram of an exemplary food serving apparatus 100 for selectively heating or cooling a food product. The apparatus 100 includes a removeable tray 102 for holding a food product therein. The apparatus 100 also includes a housing 104 that includes a thermally-conductive liner 106 defining a receptacle 178 (shown in FIG. 3) in which the removable tray 102 is received. The thermally-conductive liner 106 is coupled in thermal communication with the removable tray 102 when the removable tray 102 is positioned within the receptacle 178.

The apparatus 100 also includes a thermoelectric module 108 that includes a thermoelectric heating/cooling device 110 (referred to herein as thermoelectric device 110) that is coupled in thermal communication with the thermally-conductive liner 106. The thermoelectric device 110 transfers thermal energy towards or away from the thermally-conductive liner 106 to selectively heat or cool the thermally-conductive liner 106 and the removable tray 102. Specifically, the thermoelectric device 110 is selectively operable in one of a heating mode and a cooling mode, and is coupled in thermal communication with the thermally-conductive liner 106 such that the thermally-conductive liner 106 draws heat away from the removable tray 102 when the thermoelectric device 110 is operated in the cooling mode, and the thermally-conductive liner 106 transfers heat to the removeable tray 102 when the thermoelectric device 110 is operated in a heating mode.

In the exemplary embodiment, the thermoelectric module 108 also includes a thermal conduction block 112, a heat sink 116, and a fan 118. The thermal conduction block 112 and the heat sink 116 are both coupled in thermal communication with the thermoelectric device 110. The thermal conduction block 112 thermally couples the thermoelectric device 110 to the thermally-conductive liner 106 in the illustrated embodiment. The thermal conduction block 112 transfers heat between the thermoelectric device 110 and the thermally-conductive liner 106. Specifically, the thermal conduction block 112 draws heat away from the thermally-conductive liner 106 when the thermoelectric device 110 is operated in cooling mode, and the thermal conduction block 112 transfers heat to the thermally-conductive liner 106 when the thermoelectric device 110 is operated in heating mode. The thermal conduction block 112 can be constructed of materials having a relatively high thermal conductivity, including, for example and without limitation, aluminum, aluminum alloys, and combinations thereof. The apparatus 100 further includes thermal insulation 120 disposed between the thermally-conductive liner 106 and a shell of the housing 104.

The apparatus 100 also includes a controller 130 that is communicatively coupled to one or more temperature sensors 132 and a user interface 134. The controller 130 is also communicatively coupled to the thermoelectric module 108 to control operation thereof (e.g., based on input received at the user interface 134).

The apparatus 100 is selectively operable on one of AC power and DC power. Specifically, the apparatus 100 is selectively connectable to a power source 136. The power source 136 may be a removable DC battery 138. Alternatively, the power source 136 may be an AC power source (e.g., an AC wall outlet, not shown), that is connected to the apparatus 100 using an AC power plug 140. The apparatus 100 includes suitable electrical components (e.g., a relay 142 and a power converter 144) to condition and/or convert the power supplied to electrical components of the apparatus 100 (e.g., the thermoelectric module 108 and the controller 130) based on the type of power, e.g., AC or DC, connected to the apparatus 100.

Figure 2:
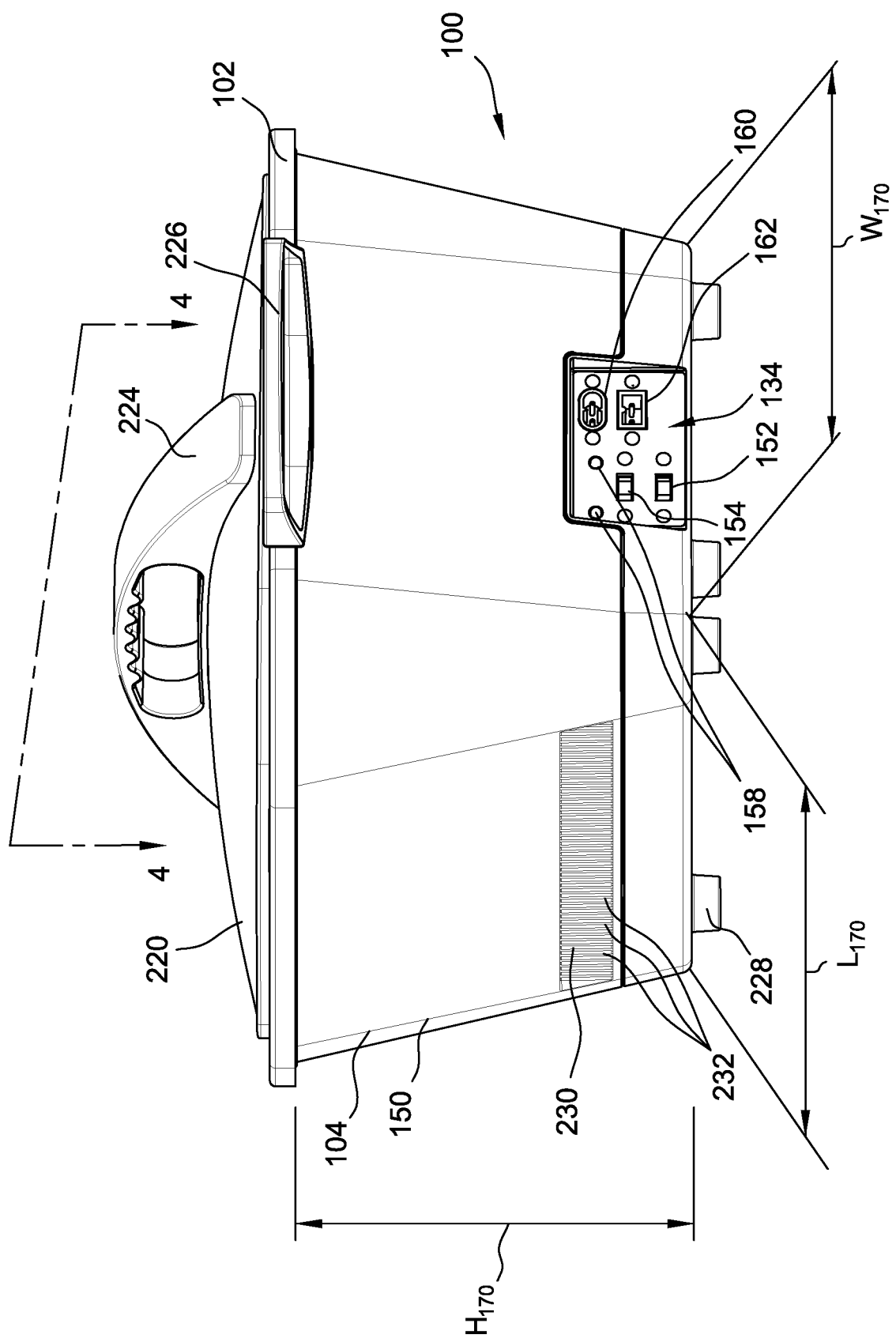
FIG. 2 is a perspective view of one embodiment of the apparatus shown in FIG. 1.

FIG. 2 is a perspective view of one embodiment of the apparatus 100 shown in FIG. 1. The user interface 134 is disposed on an exterior surface 150 of the housing 104, and includes a power switch 152 to control the supply of power to the apparatus 100. The user interface 134 also includes an operating mode switch 154 for selecting either a heating mode or a cooling mode of the thermoelectric device 110.

In some embodiments, the user interface 134 may also include a display (not shown in in FIG. 2) for displaying information. The display may display various information about the apparatus 100. For example, the display may display a temperature measured by the one or more temperature sensors 132. For example, the display may display an ambient temperature, a temperature of the removable tray 102, a temperature of the thermally-conductive liner 106, and/or a temperature of the thermoelectric device 110. Additionally or alternatively, the display may display a timer and/or a time.

The user interface 134 may also include one or more indicator lights 158, that indicate a current operating mode of the apparatus 100. In the illustrated embodiment, for example, the apparatus 100 includes two LED lights, that individually may be illuminated to indicate that the apparatus 100 is in either the heating mode or the cooling mode. In alternative embodiments, the user interface 134 may allow the user to select a specific temperature setting and/or a temperature range. The apparatus 100 may include a plurality of temperature mode settings. For example, the temperature mode settings may include hot high, hot medium, hot low, cold high, cold medium, and cold low. The controller 130 regulates the temperature of the thermoelectric device 110 based on sensor data received from the temperature sensor 132 and the selected operating mode. The user interface 134 may include any suitable user inputs, e.g., buttons, switches, sliders, knobs, and the like, that may be used to select a mode of the apparatus 100. In some embodiments, the display includes a touch screen display that may be used to select an operating mode of the apparatus 100.

The apparatus 100 (specifically, the user interface 134) includes an AC plug receptacle 160 that is connectable to the AC power plug 140. The apparatus 100 further includes a battery receptacle 162 that is connectable to the removable DC battery 138. The removable DC battery can include any suitable DC battery construction that enables the apparatus 100 to function as described herein, including for example and without limitation, a 12-volt DC battery. The apparatus 100 operates on AC power when the AC plug receptacle 160 is connected to an AC power source via the AC power plug 140, and operates on DC power when the removable DC battery 138 is connected to the battery receptacle 162. The relay 142 directs the power received from the power source 136 to the power converter 144 based on the type of power, e.g., AC or DC, received from the power source 136. Specifically, when the AC power plug 140 is connected to the AC plug receptacle 160, the relay 142 directs the AC power to the power converter 144 to convert the AC power to DC power. When the removable DC battery 138 is connected to the battery receptacle 162, the apparatus 100 operates on the DC power received from the removable DC battery 138. When both the removable DC battery 138 and the AC power plug 140 are connected to the AC plug receptacle 160 and the battery receptacle 162, respectively, the apparatus 100 operates on the power received from the AC power plug 140. In some embodiments, the DC battery 138 may be charged by the AC power source when both the AC power plug 140 and the DC battery 138 are connected to the apparatus 100. The apparatus 100 may include any suitable electrical and electronic components that enable suitable power to be delivered to powered devices of the apparatus 100 (e.g., the thermoelectric module 108).

Figure 3:
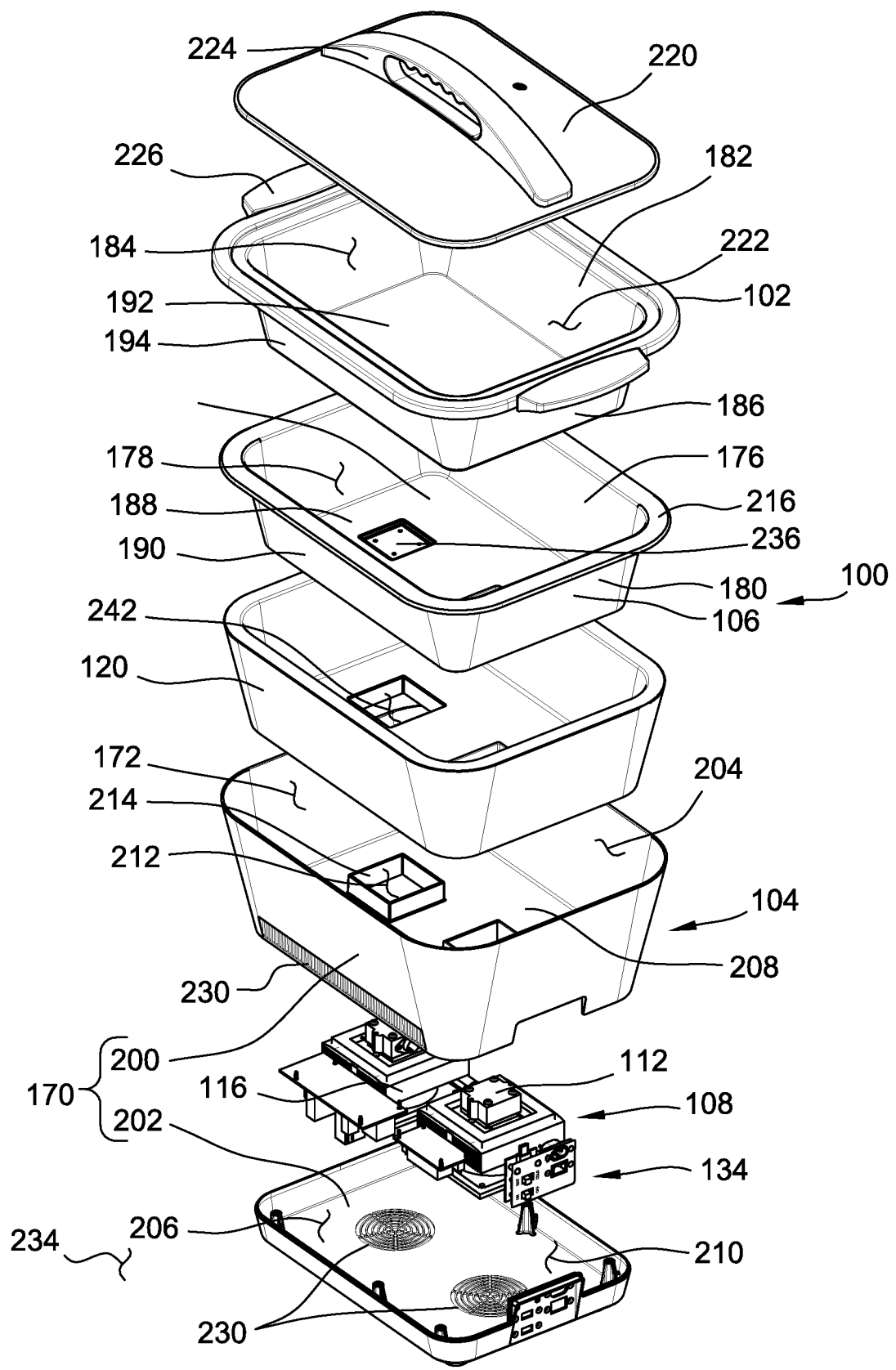
FIG. 3 is a perspective exploded view of the food serving apparatus shown in FIG. 2.

FIG. 3 is a perspective exploded view of the apparatus 100 shown in FIG. 2. As shown in FIG. 3, the housing 104 further includes a shell 170 that is coupled (e.g., directly or indirectly) to the thermally-conductive liner 106. The shell 170 defines a housing cavity 172. The housing cavity 172 is sized and shaped to receive the thermally-conductive liner 106 therein. The thermally-conductive liner 106 includes an interior liner surface 176 defining a receptacle 178, an outer liner surface 180, and a liner thickness $T_{106}$ (shown in FIG. 4) extending therebetween. The removable tray 102 includes an interior tray surface 182 defining a cavity 184 for receiving a food product, an exterior tray surface 186, and a tray thickness $T_{102}$ (shown in FIG. 4) extending therebetween. The thermally-conductive liner 106 includes a liner base 188 and a liner sidewall 190 extending therefrom. The liner sidewall 190 extends generally upwards from the liner base 188. The liner base 188 includes a surface area. The removable tray 102 includes a tray base 192 and a tray sidewall 194 extending therefrom. The tray sidewall 194 extends generally perpendicularly from the tray base 192. The tray base 192 includes a surface area.

The apparatus 100 is sized and shaped so as to be portable, e.g., the apparatus 100 may be lifted and manipulated. The apparatus 100 includes a footprint that is sized such that the apparatus 100 may rest on a standard sized countertop or table. Accordingly, the apparatus 100 may be easily lifted and transported by a single person, e.g., to and from one location to another. In the exemplary embodiment, the shell 170 includes a height $H_{170}$, a length $L_{170}$, and a width $W_{170}$. In some embodiments, the height $H_{170}$ is in the range of 4 to 12 inches, in the range of 4-8 inches, in the range of 6-10 inches, in the range of 5-9 inches, or in the range of 6-8 inches. In some embodiments, the length L-O is in the range of 10-30 inches, in the range of 10-20 inches, in the range of 15-30 inches, in the range of 10-18 inches, in the range of 12-20 inches, in the range of 14-18 inches, or in the range of 15-17 inches. In some embodiments, the width $W_{170}$ is in the range of 5-15 inches, in the range of 5-12 inches, in the range of 8-15 inches, in the range of 8-12 inches, or in the range of 9-11 inches. In one particular embodiment, the apparatus has a height $H_{170}$ of approximately 7 inches, a length $L_{170}$ of approximately 16 inches, and a width $W_{170}$ of approximately 10 inches. The apparatus 100 has a suitable mass to enable the apparatus to be lifted and manipulated by a single person. In some embodiments, for example, the apparatus 100 has a mass less than 30 pounds, less than 25 pounds, less than 20 pounds, less than 15 pounds, or less than 10 pounds. In some embodiments, the apparatus 100 has a mass in the range of 5-25 pounds, in the range of 5-20 pounds, in the range of 5-15 pounds, in the range of 8-20 pounds, in the range of 10-20 pounds, in the range of 10-15 pounds, in the range of 15-20 pounds, or in the range of 12-18 pounds.

In the exemplary embodiment, the removeable tray 102 is shaped complementary to the thermally-conductive liner 106 such that the removable tray 102 forms a conformal thermal heat exchange interface with the thermally-conductive liner 106 when placed within the receptacle 178. When the removable tray 102 is disposed within the receptacle 178, the tray base 192 engages with the liner base 188. In addition, when the removable tray 102 is disposed within the receptacle 178, the tray sidewall 194 of the removable tray 102 engages with the liner sidewall 190 of the thermally-conductive liner 106. In other words, when the removable tray 102 is received within the receptacle 178, the exterior tray surface 186 of the removable tray 102 and the interior liner surface 176 are in direct contact and are flush with one another.

In the exemplary embodiment, the conformal thermal heat exchange interface between the removable tray 102 and the thermally-conductive liner 106 extends over the entirety of the exterior tray surface 186. In other words, the thermally-conductive liner 106 transfers thermal energy to and from the removeable tray 102 over the entire area of the exterior tray surface 186 of the removeable tray 102. In alternative embodiments, the conformal thermal heat exchange interface between the removable tray 102 and the thermally-conductive liner 106 extends over at least a portion of the exterior tray surface 186. In alternative embodiments, the conformal thermal heat exchange interface between the removable tray 102 and the thermally-conductive liner 106 extends over a majority (i.e., greater than 50%) of the entirety of the exterior tray surface 186. In addition, the conformal thermal heat exchange between the removeable tray 102 and the thermally-conductive liner 106 is such that the temperature distribution over the entirety of the removable tray 102 is generally uniform.

The thermally-conductive liner 106 may be constructed of materials having a suitably high thermal conductivity, including for example and without limitation, stainless steel, aluminum, aluminum alloys, and combinations thereof. The thermally-conductive liner 106 may have a thickness in the range of 0.5 to 2.5 millimeters (mm), in the range of 0.5 to 2.0 mm, in the range of 1.0 to 2.5 mm, in the range of 0.7 to 1.5 mm, or in the range of 0.8 to 1.2 millimeters. In some embodiments the thermally-conductive liner 106 may not have a uniform thickness. For example, in some embodiments, the thickness of the liner base 188 is thicker than the thickness of the liner sidewall 190. In some embodiments, the thickness $T_{106}$ of the thermally-conductive liner 106 is the same or substantially the same as the thickness $T_{102}$ of the removable tray 102. In some embodiments, the thickness $T_{106}$ of the thermally-conductive liner 106 is greater than the thickness $T_{102}$ of the removable tray 102.

The removable tray 102 is composed of food grade material suitable for holding and storing a food product within the cavity 184. In some embodiments, the removable tray 102 is safe to be used within an oven for heating a food product. In some embodiments, for example, the removable tray 102 is thermally stable up to temperatures of 400° F., up to 450° F., up to 500° F., up to 550° F., or even up to 600° F. In the exemplary embodiment, the removable tray 102 is composed of a material that is thermally stable up to temperatures 450° F. Thermally stable refers to the removable tray 102 being chemically and structurally stable for at least two hours at the stated temperature. In other words, the removable tray 102 may be used for heating within an oven or for cooling within a refrigerator or freezer, without altering the chemical or structural integrity of the removable tray 102. The removable tray 102 may be constructed of materials having a suitable thermal conductivity and stability, including for example and without limitation, stainless steel, aluminum, aluminum alloys, and combinations thereof. The interior tray surface 182 may be coated with a non-stick coating suitable for containing a food product therein. In the exemplary embodiment, the removable tray 102 includes a polytethrafluoroethyle coating on the interior tray surface 182. The removable tray 102 may have any suitable tray thickness $T_{102}$. In some embodiments, the removable tray 102 is suited for use in a microwave.

In some embodiments, the apparatus 100 includes a plurality of interchangeable removeable trays 102 suitable for use with apparatus 100. For example, in some embodiments, the apparatus 100 includes a first removable tray and a second removeable tray that are adapted for different uses. In some embodiments, the removable tray 102 may include partitions for separating food products within the cavity 184. In some embodiments, apparatus 100 may include supplementary trays that are sized and shaped to be received and/or nested within the removable tray 102. The plurality of removable trays enables a user to select a removable a tray suitable for the type of food product and/or a selected temperature/mode of the apparatus 100.

In the exemplary embodiment, the shell 170 includes an upper shell 200 and a lower shell 202. The upper shell 200 and the lower shell 202 may be coupled together using suitable fasteners. The upper shell 200 defines an external cavity 204 that is sized and shaped for receiving the thermally-conductive liner 106, the thermal insulation 120, and the removable tray 102 therein. The thermally-conductive liner 106 is generally shaped complementary to the upper shell 200. The lower shell 202 and a portion of the upper shell 200 defines an internal cavity 206 for storing components of the apparatus 100 therein, such as the thermoelectric module 108, the relay 142, the power converter 144, and the controller 130. The upper shell 200 includes a base wall 208 that covers an opening 210 of the lower shell 202 when the upper shell 200 and lower shell 202 are coupled together. The base wall 208 includes one or more passageways 212 defined therein and extending therethrough. The passageways 212 are sized such that at least a portion of the thermal conduction block 112 is disposed within the passageway 212. In some embodiments, at least a portion of the thermal conduction block 112 extends into the external cavity 204. In the illustrated embodiment, the passageways 212 are surrounded and defined by walls 214 extending upwards from the base wall 208.

The apparatus 100 includes a lid 220 that selectively covers an opening 222 defined by the removable tray 102. The lid 220 may include one or more handles 224 that may be used to hold and/or manipulate the lid 220. In addition, removable tray 102 includes a pair of handles 226, that may be used to hold and/or manipulate the removable tray 102, e.g., the handles 226 may be used to lift the removable tray 102 from the receptacle 178 of the thermally-conductive liner 106. In some embodiments, the housing 104 may include one or more handles for moving the apparatus 100. The housing 104 includes a plurality of feet 228, extending from lower shell 202. The plurality of feet 228 to support the housing 104, such that the lower shell 202 is spaced from a surface upon which the apparatus 100 rests, e.g., on a countertop, etc. The handles 224, the housing 104, the feet 228 are made from materials having a relatively low thermal conductivity, such as plastics. The lower shell 202 includes one or more vents 230 having a plurality of apertures 232 allowing air to circulate between an exterior 234 of the apparatus 100 and the internal cavity 206. The upper shell 200 also includes one or more vents 230 having a plurality of apertures 232 allowing air to circulate between the exterior 234 and the internal cavity 206.

Figure 4:
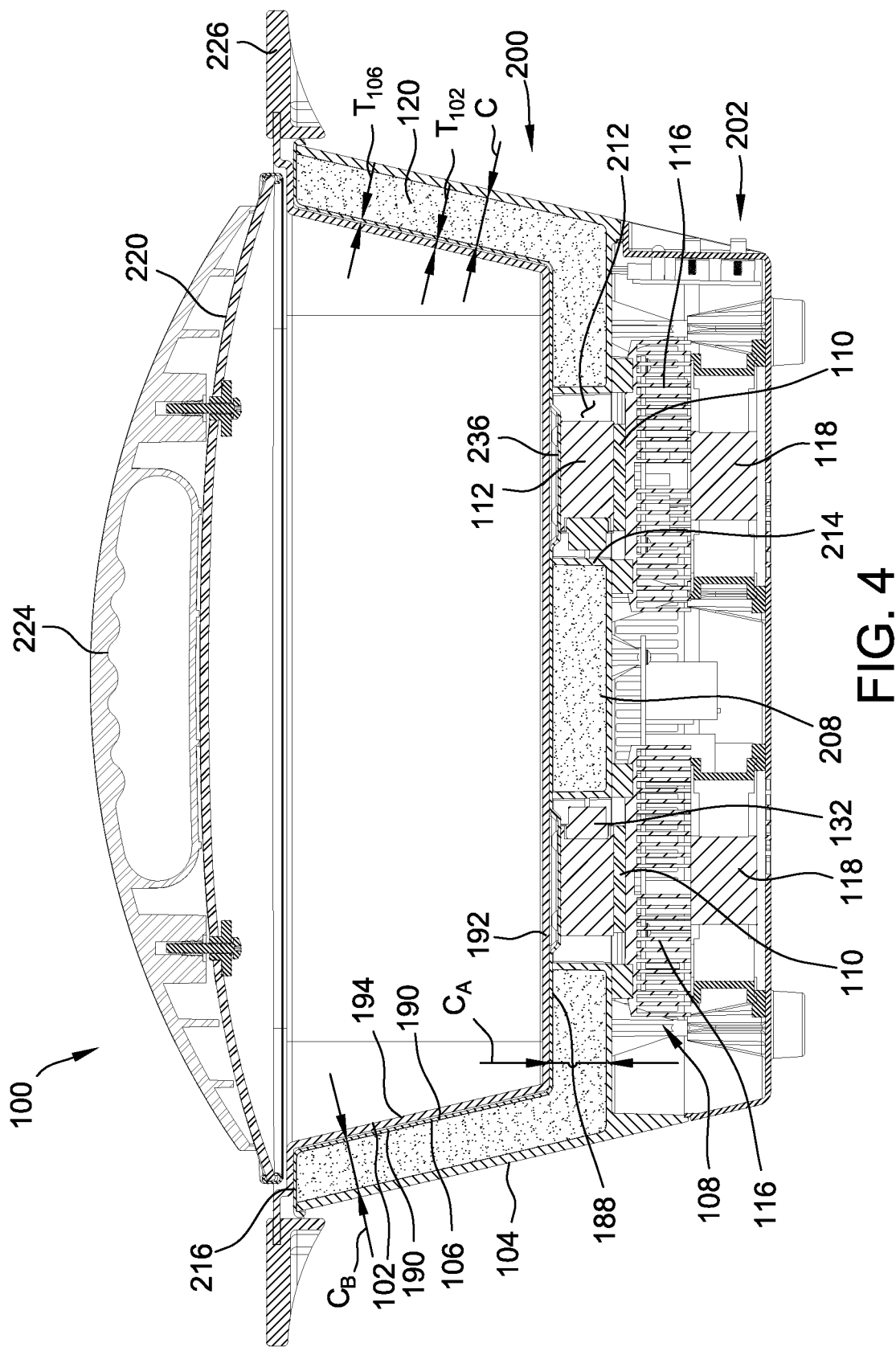
FIG. 4 is a cross-sectional view of the food serving apparatus shown in FIG. 2.

FIG. 4 shows a cross-section of the apparatus 100 along the line 4-4 shown in FIG. 2. In the exemplary embodiment, the thermally-conductive liner 106 includes one or more extruded portions 236 extending from the liner base 188. The extruded portions 236 are positioned within the passageways 212 when the thermally-conductive liner 106 is coupled to the housing 104. In the exemplary embodiment, the thermally-conductive liner 106 is coupled in thermal communication with the thermal conduction block 112 within the passageway 212. In alternative embodiments, the thermally-conductive liner 106 is coupled to the thermal conduction block 112 within the external cavity 204. In some embodiments, the thermal conduction block 112 is in direct contact with the thermally-conductive liner 106. In some embodiments, the thermal conduction block 112 is coupled to the thermally-conductive liner 106 using an adhesive material with suitable conduction properties. In the exemplary embodiment, the thermal conduction block 112 is coupled to the thermally-conductive liner 106 at the extruded portions 236 using a plurality of fasteners 240 (e.g., screws). A thermally-conductive paste may be applied between the thermally-conductive liner 106 and the thermal conduction block 112. The thermally-conductive paste can further facilitate the transfer of thermal energy between the thermally-conductive liner 106 and the thermal conduction block 112. The thermally-conductive paste may be applied between any two adjacent parts to facilitate transfer of thermal energy therebetween.

In the exemplary embodiment, the thermally-conductive liner 106 is coupled to the shell 170 about an upper edge 216 of the thermally-conductive liner 106. The liner base 188 and the liner sidewall 190 are separated from the shell 170 by a clearance C. A first clearance $C_A$ extends between the liner base 188 and the base wall 208, and a second clearance $C_B$ extends between the liner sidewall 190 and an outer sidewall of the shell 170. In the exemplary embodiment, the clearance C is generally uniform, e.g., the first clearance $C_A$ has the same thickness as the second clearance $C_B$. Alternatively, the clearance C may be not uniform, e.g., the clearance C may be narrower or thicker in different locations. For example, in some embodiments, the first clearance $C_A$ may be thicker than the second clearance $C_B$.

In the exemplary embodiment, the thermal insulation 120 is disposed within the clearance C. The thermal insulation 120 can be constructed of any suitable thermally-insulative material that enables the apparatus 100 to function as described herein, including, for example and without limitation, thermally-insulative foams, such as polyurethane foam, polystyrene foam, and/or polyethylene foam. In some embodiments, air is contained in the clearance C. In the exemplary embodiment, the thermal insulation 120 completely fills the clearance C. In other embodiments, the thermal insulation 120 may only partially fill the clearance C. The thermal insulation 120 includes one or more openings 242 (shown in FIG. 3) sized such that the wall 214 defining the passageway 212, is disposed within the opening 242. Accordingly, the thermal insulation 120 surrounds the wall 214.

Figure 5:
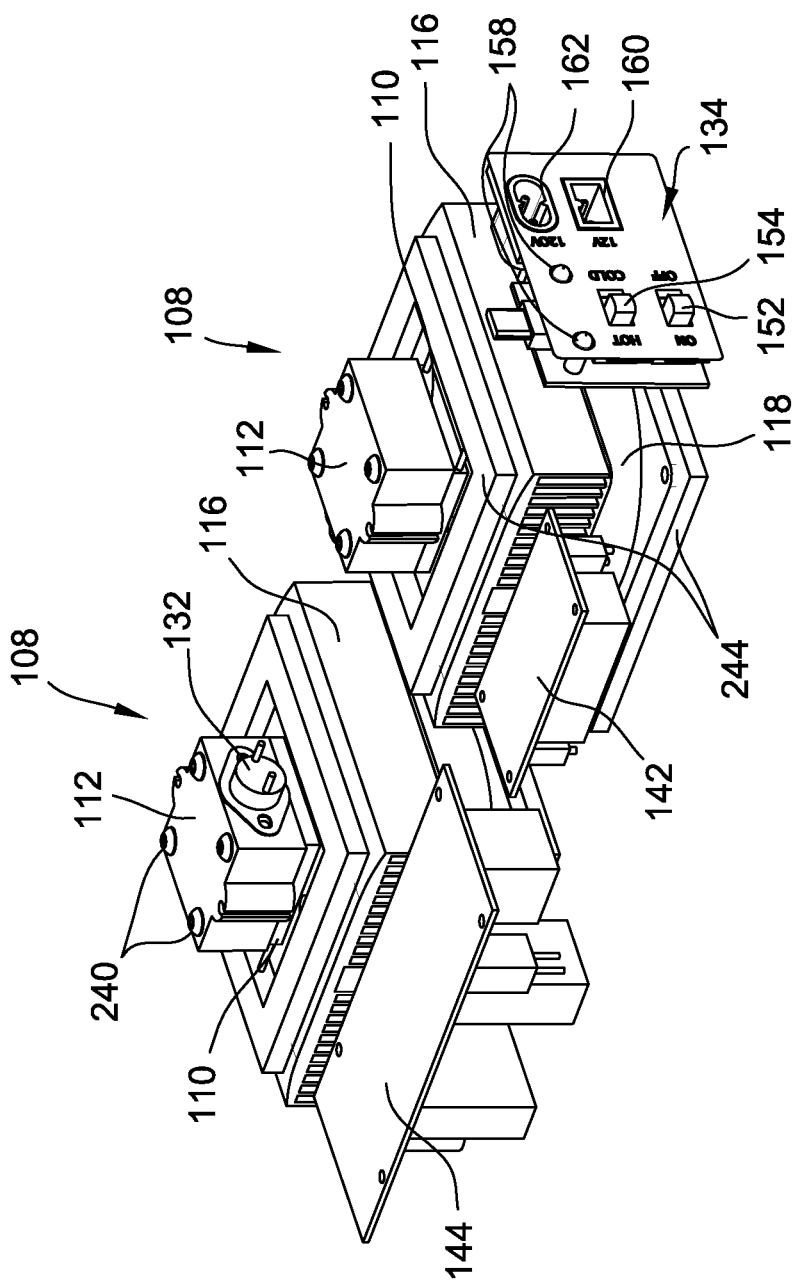
FIG. 5 is a perspective view a plurality of thermoelectric modules including a thermoelectric device for use with the food serving apparatus shown in FIG. 2.

FIG. 5 illustrates the thermoelectric modules 108, the relay 142, the power converter 144, and the user interface 134. In the exemplary embodiment, the apparatus 100 includes two thermoelectric modules 108. Each of the thermoelectric modules 108 includes one thermoelectric device 110. Accordingly, the apparatus 100 includes two thermoelectric devices 110. In other embodiments, the apparatus 100 may include any suitable number of thermoelectric devices 110 that enable the apparatus 100 to function as described herein. For example, in some embodiments, the apparatus 100 may include three, four, or five thermoelectric devices 110. The power converter 144 and the relay 142 are both coupled to the user interface 134 and the AC plug receptacle 160 and the battery receptacle 162. In the exemplary embodiment, the thermoelectric module 108 includes module insulation 244. The module insulation 244 at least partially surrounds the thermoelectric device 110.

The illustrated embodiment includes a single temperature sensor 132, e.g. a thermocouple, coupled to the thermal conduction block 112 to measure the temperature of the thermal conduction block 112. In alternative embodiments, the apparatus 100 includes a plurality of temperature sensors 132. The temperature sensors 132 may be arranged to detect at least one of an ambient temperature, a temperature of the thermally-conductive liner 106, a temperature of the removable tray 102, a temperature of the thermal conduction block 112, and a temperature of the thermoelectric device 110.

Figure 6:
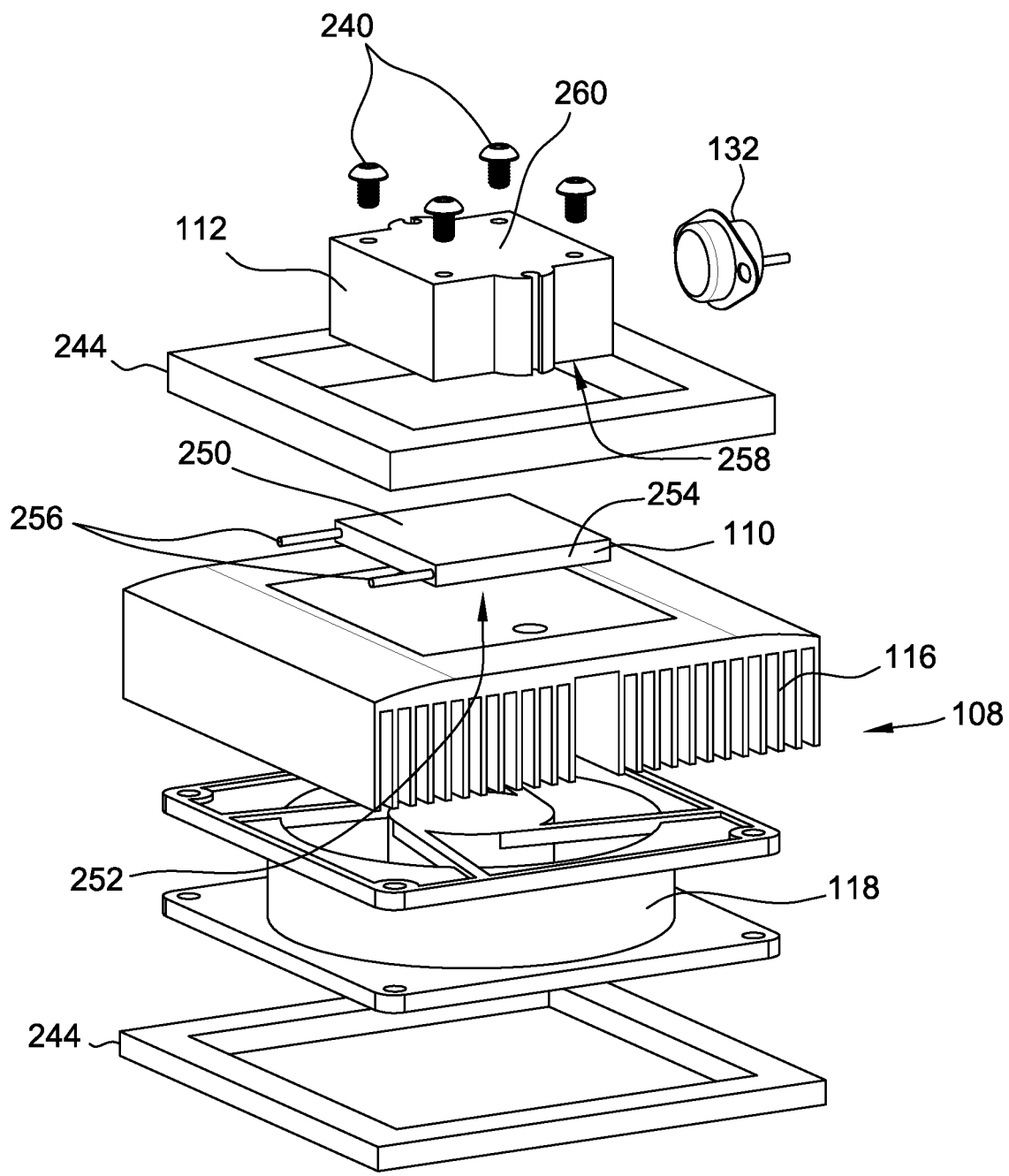
FIG. 6 is an exploded view of one of the thermoelectric modules shown in FIG. 5.

FIG. 6 is an exploded view of one of the thermoelectric modules 108. In the exemplary embodiment, the thermoelectric device 110 is a Peltier plate. The thermoelectric device 110 includes a first plate 250 and a second plate 252 separated by a semiconductor 254 disposed between the first plate 250 and the second plate 252. The thermoelectric device 110 includes a pair of leads 256 across which a voltage may be applied causing current to flow in either a first direction or in an opposite second direction. Electric current flowing through the thermoelectric device 110, in a first direction, causes the first plate 250 to heat while cooling the second plate 252. When the direction of the current is switched to flow in the second direction, the second plate 252 heats while the first plate 250 cools. The heating and cooling mode of the thermoelectric device 110 is selectable by the user by positioning of the operating mode switch 154 on the user interface 134. The operating mode switch 154 is communicatively coupled to the controller 130. When the operating mode switch 154 is positioned in a heating position, the controller 130 supplies a voltage to the leads 256 of the thermoelectric device 110 to induce a current flowing in the first direction causing heating of the first plate 250. When the operating mode switch 154 is positioned in the cool position, the controller 130 supplies a voltage to the leads 256 of the thermoelectric device 110 to induce a current flowing in the second opposite direction, causing heat to be drawn from the first plate 250.

The second plate 252 is coupled in thermal communication with the heat sink 116. The heat sink 116 dissipates the heat of the second plate 252. The fan 118 is operable to circulate an airflow around and/or across the heat sink 116 and/or to circulate an airflow from the exterior 234 of the housing 104 to the inside of the internal cavity 206. The fan 118 is disposed within the internal cavity 206 in proximity to at least one of the vents 230. In some embodiments, the thermally-conductive paste may be applied between the second plate 252 and the heat sink 116 to transfer thermal energy therebetween.

The first plate 250 is coupled in thermal communication with the thermal conduction block 112 such that the thermal condition of the first plate 250 is transmitted to the thermal conduction block 112. The first plate 250 includes a plate surface area that is coupled in thermal communication with a first side 258 of the thermal conduction block 112. The thermal conduction block 112 includes a second side 260 having a surface area that is coupled in thermal communication with the thermally-conductive liner 106. The total surface area over which thermal energy is transferred between the thermoelectric modules 108 and the thermally-conductive liner 106 is based on the number of thermoelectric modules 108 and surface area of the thermal conduction block 112. In the exemplary embodiment, the apparatus 100 includes two thermoelectric devices 110 and two thermal conduction blocks 112, such that the surface area over which thermal energy is transferred is twice the surface area of a single thermal conduction block 112. The total surface area over which thermal energy is transferred is sized such that thermal energy is transferred over a substantial portion of the surface area of the liner base 188. For example, the total area may be a majority (e.g., greater than 50%) of the surface area of the base of the thermally-conductive liner 106. Accordingly, the plurality of thermoelectric devices 110 quickly and uniformly heats and/or draws heat away from the thermally-conductive liner 106. The thermally-conductive paste may be applied between the first plate 250 and the thermal conduction block 112 to transfer thermal energy therebetween.

The apparatus 100 shown in FIGS. 1-6 may be assembled using an exemplary assembly method described herein. The assembly method includes positioning a plurality of the thermoelectric device 110 with the housing cavity 172 defined by the shell 170. The assembly method further includes coupling the plurality of thermoelectric devices 110 in thermal communication with the thermally-conductive liner 106. Coupling the plurality of thermoelectric devices 110 in thermal communication with the thermally-conductive liner 106 can include coupling the first side 258 of the thermal conduction block 112 to the first plate 250 of the thermoelectric device 110, and coupling the thermally-conductive liner 106 to the second side 260 of the thermal conduction block 112. In some assembly methods, coupling includes bolting the thermally-conductive liner 106 to the thermal conduction block 112. In some assembly methods, coupling includes coupling the thermally-conductive liner 106 to the thermal conduction block 112 using a thermally-conductive adhesive. In the exemplary embodiment, the thermally-conductive adhesive may include epoxy adhesive and/or thermoplastic adhesive.

The method may include disposing the thermal insulation 120 within the clearance C between the shell 170 and the thermal-conduction liner 106. In some embodiments, the assembly method includes inserting the thermal insulation 120 within the housing cavity 172 and then subsequently inserting the thermal-conduction liner 106 within the housing cavity 172. In another embodiment, the assembly method includes disposing the thermal insulation 120 on the thermally-conductive liner 106, and then inserting both the thermal insulation 120 and the thermally-conductive liner 106 within the housing cavity 172.

The assembly method further includes positioning the removable tray 102 within the receptacle 178 defined by the thermally-conductive liner 106 such that the removable tray 102 is coupled in thermal communication with the thermally-conductive liner 106. The removable tray 102 may be a standard baking tray size, e.g., 9×11 inches baking pan.

The apparatus 100 may be used to selectively heat or cool a food product according to a method of use as described herein. The method of use includes providing the removable tray 102 with a food product contained therein. The food product may be placed within the removable tray 102, when the removable tray 102 is either coupled in thermal communication with the thermally-conductive liner 106 or when the removable tray 102 is removed from the apparatus 100.

The method of use includes positioning the removable tray 102 within the receptacle 178 of the thermally-conductive liner 106 such that the removeable tray 102 is thermally coupled to the thermally-conductive liner 106. The method of use further includes selectively operating the thermoelectric heating/cooling devices 110 in one of a heating mode and a cooling mode to heat or cool the food product.

Embodiments of the apparatus described herein have several advantages over known food serving devices. Embodiments of the apparatus disclosed herein include a plurality of thermoelectric devices that may be used to selectively heat and/or cool a food product stored within the removable tray. The plurality of thermoelectric devices transfers thermal energy over a relatively large area (e.g., a majority of the area) of the liner base to quickly and uniformly either heat or draw heat away from the thermally-conductive liner. The removable tray is conveniently removable from the apparatus for cleaning or cooking. In the exemplary embodiments, the removable tray is composed of a material that is thermally and chemically stable at temperatures suitable for use in an oven. Accordingly, the removable tray may be used within an oven for cooking/heating the food product stored therein and then transferred from the oven to be received within the receptacle of the thermally-conductive liner. Additionally, the removable tray may be transferred from a refrigerator or freezer and then received within the thermally-conductive liner. The conformal thermal heat exchange interface between the removable tray and the thermally-conductive liner extends over a majority of (e.g., the entirety) the exterior surface of the removable tray. As such, the apparatus maintains a generally uniform temperature distribution throughout the entire removable tray. Furthermore, the overall size and weight of the apparatus is such that the apparatus is portable.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawings shall be interpreted as illustrative and not in a limiting sense.

What is claimed is:

1. An apparatus for selectively heating or cooling a food product, the apparatus comprising:
    a housing comprising:
        a shell defining a housing cavity and a plurality of passageways; and
        a thermally-conductive liner coupled to the shell and including a plurality of extruded portions each positioned within a corresponding one of the plurality of passageways, the thermally-conductive liner defining a receptacle;
    a removable tray sized and shaped to be received within the receptacle such that the removable tray is coupled in thermal communication with the thermally-conductive liner;
    a plurality of thermoelectric heating/cooling devices disposed within the housing cavity; and
    a plurality of thermal conduction blocks, each block thermally coupled between one of the plurality of thermoelectric heating/cooling devices and a corresponding one of the plurality of extruded portions,
    wherein each of the thermoelectric heating/cooling devices is selectively operable in a heating mode and a cooling mode such that the thermally-conductive liner draws heat away from the removable tray when the thermoelectric heating/cooling devices are operated in the cooling mode, and the thermally-conductive liner transfers heat to the removable tray when the thermoelectric heating/cooling devices are operated in the heating mode.

2. The apparatus of claim 1 further comprising thermal insulation disposed between the thermally-conductive liner and the shell.

3. The apparatus of claim 2, wherein the thermal insulation comprises at least one of polyurethane foam, polystyrene foam, and polyethylene foam.

4. The apparatus of claim 1, wherein the removable tray is shaped complementary to the thermally-conductive liner such that the removable tray forms a conformal thermal heat exchange interface with the thermally-conductive liner when placed within the receptacle.

5. The apparatus of claim 4, wherein the removeable tray includes a base and a sidewall extending from the base, and wherein each of the base and the sidewall engages the thermally-conductive liner when the removeable tray is received with the receptacle.

6. The apparatus of claim 1, wherein the removable tray is thermally stable up to a temperature of 450° F.

7. The apparatus of claim 1, wherein the removable tray is constructed of stainless steel, aluminum, aluminum alloys, and combinations thereof.

8. The apparatus of claim 1, wherein the removable tray comprises a polytethrafluoroethyle coating on an interior surface thereof.

9. The apparatus of claim 1, wherein each of the thermoelectric heating/cooling devices comprises a Peltier plate.

10. The apparatus of claim 1, wherein the thermally-conductive liner is constructed of aluminum, aluminum alloys, steel, and combinations thereof.

11. The apparatus of claim 1, wherein the apparatus is selectively operable on AC power and DC power.

12. The apparatus of claim 1 further comprising:
    an AC plug receptacle connectable to an AC power plug; and
    a battery receptacle connectable to a removable DC battery;
    wherein the apparatus operates on AC power when the AC plug receptacle is connected to an AC power source by the AC power plug; and
    wherein the apparatus operates on DC power when the removable DC battery is connected to the battery receptacle.

13. The apparatus of claim 1 further comprising at least one temperature sensor configured to detect at least one of an ambient temperature, a temperature of the thermally-conductive liner, a temperature of the removable tray, and a temperature of at least one of the plurality of thermoelectric devices.

14. The apparatus of claim 12 further comprising a display configured to display the at least one at least one an ambient temperature, temperature of the thermally-conductive liner, a temperature of the removable tray, and temperature of at least one of the plurality of thermoelectric devices.

15. The apparatus of claim 1 further comprising a lid that is selectively attachable to a top of the removeable tray to cover an opening defined by a top of the removable tray.

16. The apparatus of claim 1 further comprising:

at least one heat sink thermally coupled to each of the thermoelectric heating/cooling devices; and at least one fan operable to direct an airflow across the at least one heat sink to remove heat from the at least one heat sink.

17. A method of assembling an apparatus for selectively heating or cooling a food product, the apparatus including a plurality of thermoelectric heating/cooling devices, a shell defining a plurality of passageways, a plurality of thermal conduction blocks, a thermally-conductive liner including a plurality of extruded portions, and a removable tray, the method comprising:

positioning the plurality of thermoelectric heating/cooling devices within a housing cavity defined by the shell, wherein each of the thermoelectric heating/cooling devices is selectively operable in a heating mode and a cooling mode;

positioning the plurality of thermal conduction blocks within a corresponding one of the plurality of passageways of the shell and in thermal communication with a corresponding one of the plurality of thermoelectric heating/cooling devices;

positioning the thermally-conductive liner within the housing cavity of the shell such that each of the plurality of extruded portions is positioned within a corresponding one of the plurality of passageways and the thermal conduction blocks are coupled in thermal communication between the plurality of thermoelectric heating/cooling devices and a corresponding one of the plurality of extruded portions; and positioning a removable tray within a receptacle defined by the thermally-conductive liner such that the removable tray is coupled in thermal communication with the thermally-conductive liner, wherein the thermally-conductive liner draws heat away from the removable tray when the thermoelectric heating/cooling devices are operated in the cooling mode, and the thermally-conductive liner transfers heat to the removable tray when the thermoelectric heating/cooling devices are operated in the heating mode.

18. The apparatus of claim 1 further comprising a temperature sensor coupled to one of the plurality of thermal conduction blocks and configured to detect a temperature of the one of the plurality of thermal conduction blocks.

19. The method of claim 17 further comprising positioning thermal insulation between the thermally-conductive liner and the shell.

20. A method of using a food serving apparatus including a plurality of thermoelectric heating/cooling devices, a shell defining a plurality of passageways, a plurality of thermal conduction blocks, and a thermally-conductive liner coupled to the shell and including a plurality of extruded portions each positioned within a corresponding one of the plurality of passageways, the method comprising:

providing a removable tray with a food product contained therein;

positioning the removable tray within a receptacle defined by the thermally-conductive liner such that the removeable tray is thermally coupled to the thermally-conductive liner, wherein each of the plurality of thermal conduction blocks is thermally coupled between one of the plurality of thermoelectric heating/cooling devices and a corresponding one of the plurality of extruded portions of the thermally-conductive liner; and selectively operating the thermoelectric heating/cooling devices in one of a heating mode and a cooling mode to heat or cool the food product.

* * * * *